United States Patent [19]

Ventura

[11] Patent Number: 4,839,470

[45] Date of Patent: Jun. 13, 1989

[54] UNDERWATER (SUBMERSIBLE) JOINT OR SPLICE

[76] Inventor: Robert M. Ventura, 127 New Providence Rd., Mountainside, N.J. 07092

[21] Appl. No.: 135,979

[22] Filed: Dec. 21, 1987

[51] Int. Cl.[4] ........................ H01R 4/20; H01R 43/04; H02G 15/08

[52] U.S. Cl. .................................... 174/84 R; 29/871; 156/49; 174/84 C; 439/750; 439/751

[58] Field of Search ............. 174/84 R, 84 C; 156/49; 439/750, 751; 29/871

[56] References Cited

U.S. PATENT DOCUMENTS

| | | | |
|---|---|---|---|
| 2,276,571 | 3/1942 | Grypma | 156/49 X |
| 2,802,257 | 8/1957 | Holtzapple | 174/84 C |
| 2,917,569 | 12/1959 | Senior, Jr. | 174/84 C |
| 2,958,722 | 11/1960 | Rubin et al. | 174/84 R |
| 3,158,680 | 11/1964 | Lovitt et al. | 174/88 R |
| 3,281,524 | 10/1966 | Lynch, Jr. et al. | 174/84 C |
| 3,291,894 | 12/1966 | Sampson | 174/84 R |
| 3,739,470 | 6/1973 | Eppler | 174/84 C |
| 3,846,578 | 11/1974 | Bahder et al. | 174/88 R |
| 4,025,717 | 5/1977 | Whittingham | 174/88 C |
| 4,196,308 | 4/1980 | Siden | 174/84 C |
| 4,313,028 | 1/1982 | Oldham et al. | 174/70 S |
| 4,403,110 | 9/1983 | Morrisette | 174/84 R |
| 4,433,205 | 2/1984 | Summers | 174/84 C |
| 4,450,318 | 5/1984 | Scardina | 174/84 R |
| 4,485,268 | 11/1984 | Kaplan | 174/84 C |
| 4,485,269 | 11/1984 | Steinberg | 174/84 R |
| 4,501,927 | 2/1985 | Sievert | 174/93 |
| 4,508,409 | 4/1985 | Cherry et al. | 174/84 R X |
| 4,549,039 | 10/1985 | Charlebois et al. | 174/72 R |

*Primary Examiner*—Morris H. Nimmo

*Attorney, Agent, or Firm*—Martha G. Pugh

[57] ABSTRACT

This invention relates to a submersible electrical cable splice, and the method of making the same. It employs a housing sleeve of an elastomeric material which is hollowed out to include a central cavity connected at each of the ends by bores which are of slightly smaller diameter than the cables which are to be connected. In the process of making the splice, one end of the housing sleeve is lubricated, and one of the cables is pushed clear through and out the other end of the housing, where it is joined to the other cable end in abutting relation in a metal crimp connector. The joined cables are then pulled in the opposite direction back through the bore of the housing sleeve, until the crimping connector seats in the central cavity, which is of slightly smaller diameter than the crimping connector, squeezing out the air. It should be understood that a pocket or void or space is to be eliminated or reduced to insignificant amounts.

4 Claims, 2 Drawing Sheets

UNDERWATER (SUBMERSIBLE) JOINT OR SPLICE

This relates in general to electrical cable splices or joints and methods for making the same, and more particularly, to underwater cable joints and splices.

There are many types of submersible cable joints or splices presently in use. However, they have been found to have certain defects, in that may be weather sensitive, and may require special tools and skills, and time consuming operations in order to put the splice in place. Also, they may require the use of "0" rings or external wire coils in order to squeeze out air pockets and prevent water from being sucked in by what may be called the "syringe" or "breathing" effect. Some devices utilize fill material, such as resin, interposed into the interior to drive out air and seal the interior against moisture. Other prior art devices require heat-shrinking of a resin-rich coating onto the splice to fill the voids, and provide moisture resistance.

The integrity of an electrical device is constantly jeopardized by the installers ability to provide adequate continuity of the electrical conductors and insulation to the electrical cable serving this device. The continuity of the insulation system becomes increasingly more important as the surrounding operating medium changes from a dry air medium to a water medium, that is to say, from a low conductivity to a high conductivity medium.

Insulated cable and conventinal cable joints, must have its insulation protected from ingress of moisture which involves making good the insulation over the conductor joint, which in the prior art has been achieved by lapping tape over the joined area. The conventional taping method is being replaced by newer methods, such as, epoxy encapsulation and heat shrink tubing.

It is therefore the principal object of the present invention to provide a simplified underwater splice for electrical cable, which is concerned with the integrity of insulation and moisture resistance, more particularly, one that does not require special tools or skills for its application, and may be installed in the field by a simple operation. Another object of the invention is to provide a splice in which internal air pockets are removed, and which avoids the "syringe" effect in which water is sucked in when the air is expelled. These and other objects are realized in an electrical cable splice for underwater application, and technique for forming the same, which utilizes as a housing an insulating sleeve molded of synthetic rubber or elastomer material. The external shape of the device is straight and tubular with entrance holes at both ends of the tube which extend into a centered cavity of the tube. The initial water seal feature is achieved by making the cable entrance holes of such a diameter that each hole is always smaller than the outside diameter of the smallest cable size of the selected cable range which the particular style is designed to accommodate. The material from which the insulating sleeve is fabricated is chosen to provide a good memory property so that when the hole is stretched to a larger diameter it will always try to return to its originally-molded configuration. When the cable is inserted in the cable entrance hole it stretches the hole to a larger diameter. The housing material now squeezes the cable insulation causing a circumferential pressure on the cable insulation and thereby sealing off moisture and water.

The joint or splice of two insulated cables is made by first applying an inert non-hazardous lubricant such as, for example, silicon grease, specifically, this may be, for example, a polydimethysiloxane fluid with a specific gravity of 1.03, in one of the cable entrance holes found at each end of the rubber molded housing. One of the ends of the cable to be joined is then pushed through the lubricated hole with enough force to extend the cable end beyond the cable entrance hole at the other end of the tubular housing. The ends of the cables to be joined are then stripped of their insulaton to a prescribed length required to be held in place by a butt type metal crimp connector. The conductors are crimped in the connector; and the reverse action of pulling on the cable with one hand while holding on the housing with the other, will allow the connector to slip back into the lubricated cable entrance hole and come to rest in the cavity molded in the center of the housing. The device now has both cable entrance holes sealed off. As the joint is now submersed in water or other liquid, the hydrostatic pressure continues to provide an equal and uniform pressure at all points on the housing, thereby providing additional sealing off pressure. The sealing feature is further enhanced by the design of the internal configuration of the housing's centered cavity, which is so shaped that the provided crimp connector's dimensions are always greater than the corresponding dimensions of the cavity. When the connector is pulled into its final functional position inside the cavity, air pockets will not remain or be reduced to an inconsequential volume or space or pocket. The snug, interference fit design is an important consideration, because it removes air pockets which would allow water to be sucked in under certain conditions. This undesirable effect tends to occur in the situation in which the depth of the water or other liquid above the air entrapped device varies, causing a variation in the underwater pressure on elastomeric material with a good memory, which also contains an air pocket, causing the same to act like a syringe, expelling air when under greater pressure and sucking in water when pressure is reduced or removed. So shaping the housing as to design out the existence of collapsible air pockets removes this undesirable effect.

Another method to eliminate the syringe or breathing effect, is to compound a material with no memory property, of which the central cavity section is molded and bonded to entrance end sections of the device which are formed of memory molded material. Once the center section experiences external pressure, it takes a set, and does not recover to its original molded configuration thereby removing the syringe or breathing effect.

In addition to the above features, the design of the present invention also allows the connector to easily center itself in the housing, thereby assuring the maximum sealing effect in the cable entrance holes. This feature is achieved by designing the cavity hole relatively larger than the inner diameter of the cable entrance holes. As the installer pulls the joined cables and connector back into the housing, a definite relaxation in the pulling effort is experienced as the connector leaves the cable entrance hole and enters the cavity. This positive indication of connector centering can be easily felt by the installer.

In addition to the features of being simple to make and install, and providing a water-proof joint or splice when in place, it has been found that the splice of the present invention can readily be made while submersed in water.

These, and other objects, features and advantages will be better understood from a detailed study of the invention with reference to the attached drawings.

SHORT DESCRIPTION OF THE DRAWINGS

DETAILED DESCRIPTION OF THE INVENTION

Figure 1:
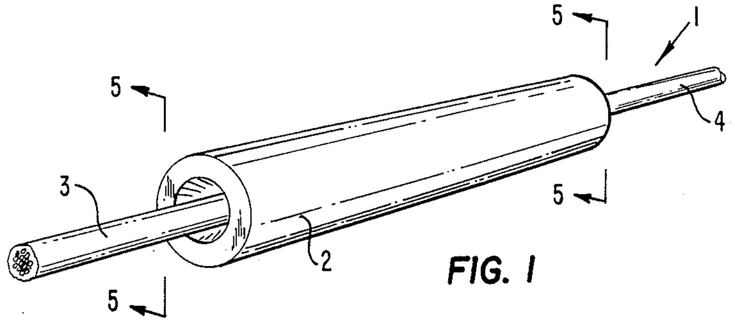
FIG. 1 is an external view, in perspective, of the electrical cable splice of the present invention in place.
Figure 2:
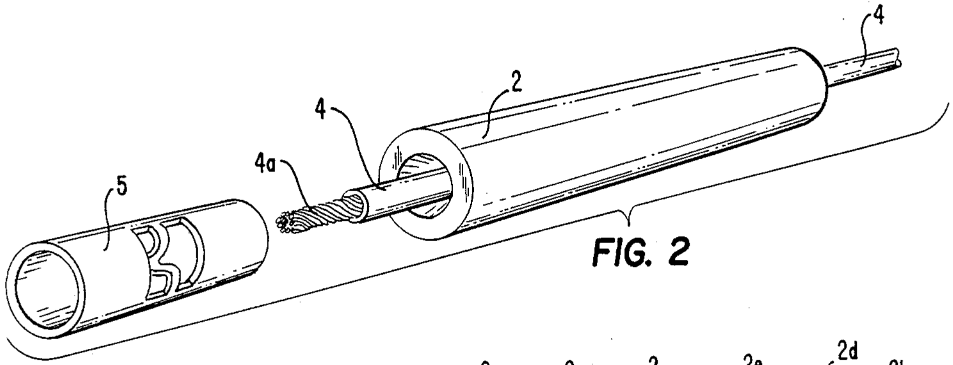
FIG. 2 is a view, in perspective, of the electrical cable splice of the present of the invention, in the process of being assembled.
Figure 3:
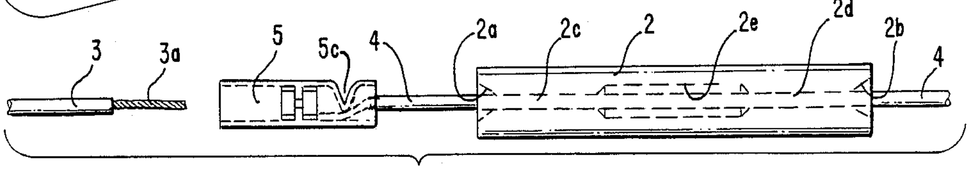
FIG. 3 is a side-elevational showing of the splice of the present invention, in process, one cable stripped and crimped and one cable end stripped and about to be inserted into a crimping connector.
Figure 4:
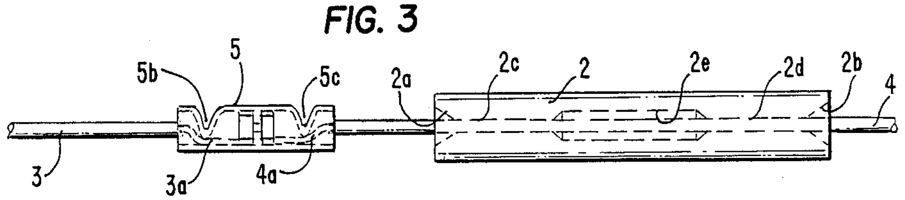
FIG. 4 is a side-elevational showing of the splice of the present invention, still in process, with the cable ends crimped together, being pulled into the housing sleeve.
Figure 5:
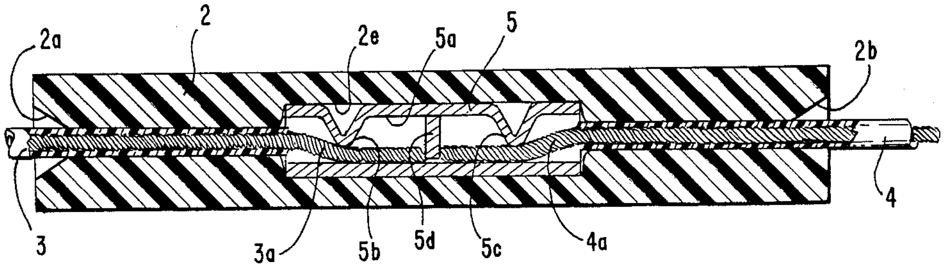
FIG. 5 is a sectional showing along the plane indicated by the arrows 5—5 of FIG. 1, of the fully assembled splice.
Figure 6:
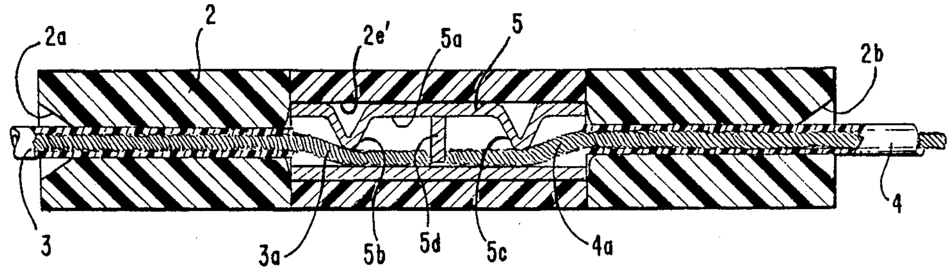

Referring to FIG. 1, there is shown, fully assembled, an electrical cable underwater insulating joint or splice in accordance with the present invention.

The present illustrative embodiment will be described to accommodate the splicing of a pair of cables 3 and 4, each comprising a plurality of copper wires twisted into a braid having a diameter, say, 3/32 inch, encased in a conventional insulating cover, say, 3/64 inch thick.

It will be understood that this example is for illustrative purposes only, and the invention can be adapted to apply to any desired cable sizes.

In the present embodiment, the sleeve or housing 2 for the splice is cylindrical, say, ½ inch in outer diameter and 2½ inches long, being formed of an elastomer or synthetic rubber material. A preferred material for the pruposes of the present invention has been found to be a special blend of ethylene propylene rubber, peroxide cured. Alternatively, this product can be sulphur cured. Other materials which have been found suitable for the purposes of the present invention, are for example, natural isoprene, polybutadiene, styrene butadiene, epichlorohydrin. Materials suitable for the purposes of the present invention preferably are characterized by a resilience of at least about 70 as measured by the Yerzley method (ASTMD 945), and a durometer hardness of at least about 55 as measured on the Shore A scale.

The compounds of which the housing 2 is formed are chosen and blended to provide a good memory property, so that when the hole or bore is stretched to a larger diameter it will always tend to return to its original configuration. In the present embodiment, the entrance holes *2a*, *2b* at opposite ends, are, say, ¼ inch in outer diameter, and are frustoconical in shape, decreasing in diameter to a bore having a diameter of, say, 3/32 inch, which extends along the axis of the housing from a plane ⅛ inch from each end to a plane, say, ¾ inch from each of the ends. The bores *2c*, *2d* at opposite ends, are cylindrical, assuming a uniform diameter of, say, 3/32 inch. An important feature of the invention is that the diameter of the bores *2c*, *2d* is always chosen to be slightly smaller than the diameter of the smallest cable to be accommodated in the sleeve.

Centered internally between the two bores *2c* and *2d* is a cylindrical chamber *2e*, which in the present embodiment is, say, 3/16 inch in diameter and one inch along the axis.

A crimp connector 5 is a conventional hollow cylindrical metal device formed of, for example, tinned copper, which, in the present embodiment, is, say, 5/16 inch in outer diameter and 1 inch long, and 3/32 inch in wall thickness.

In making the joint or splice of the two insulated cables, a lubricant, such as, for example, silicone grease, is applied at one of the entrance holes, say, *2a*. The cable 4, which is one of the cables to be spliced, is then drawn entirely through the housing 2 and out the other end, so that the wire end protrudes. The ends of both of the cables 3 and 4 to be spliced then have their insulation removed, say, ½ inch from each end, exposing the bare ends *3a* nd *4a*. The end *3a* is then interposed into the interior of the cylindrical crimp connector 5 until it abuts one face of projecting member *5d*. The other bare end *3a* of the cable 3 is interposed into the crimp connector 5 from the opposite end until it abuts the other face of *5d*. Crimping pliers, or a similar tool, are employed to force in the sides of crimp connector 5 to depress them against the respective wire ends *3a* and *4a*, forming crimps *5b* and *5c* which hold the cable ends firmly in place.

The cable 4 is then pulled back in the other direction, through the lubricated bore holes, so that the crimp connector 5 seats snugly in the cavity *2e*, with its ends conforming in tight, stretched relation to the interior of the latter.

During this process, the elastic cable housing squeezes the cable insulation, causing a circumferential pressure thereon, pushing out air, and sealing off the interior against moisture and water. As the joint is submersed in water or other liquid, the hydrostatic pressure continues to provide an equal and uniform pressure at all points on the housing, thereby providing additional sealing-off pressure or a working seal. The sealing feature is further enhanced by the design of the internal configuration of the housing's central cavity *2e*, which is so shaped that the dimensions of the crimp connector 5 are always greater than the corresponding dimension of the cavity *2e*. The snug interference fit of crimp connector 5 is designed to remove air pockets which would allow water to be sucked in when the water height, and hence the pressure on the entrapped device is varied, causing a syringe or breathing effect.

As previously stated, an alternate method of eliminating the syringe effect is to mold a central cavity *2e'* of a thermoset material, such as, for example, ethylene propylene, compounded to have a neglibible memory, or resilience, which sets in place, and does not recover its original molded configuration. The thermoset central cavity material *2e'* is then bonded or molded to the memory molded cable entrance section *2a*, *2b*. This removes the 'syringe' or breathing effect.

Although specific embodiments of the invention have been described by way of illustration, it will be understood that the invention is not limited to the particular forms or dimensions described, but only by the recitations of the appended claims.

What I claim is:

1. A splice for a submersible electrical cable the ends of which are stripped of insulation, which comprises in combination:

a tubular housing having bores which are interposed from each of its ends and extend inwardly along the axis of said housing to an internal chamber centered between said bores, and coaxial with and connected at each of its ends to said bores, the material of said tubular housing comprising an elastomer having a percent resilience of at least 70 as measured by the Yerzley method (ASTM 945);

a metal crimping connector of general hollow cylindrical shape constructed whereby in a pair of cables each having a stripped end, the connector secures the stripped ends of said cables in crimped relation prior to being imposed in said housing;

said internal chamber constructed to accommodate and relase internally said crimping connector including said stripped ends when the same has been pulled into place and seated snugly in said housing chamber;

means comprising a lubricant interposed into said tubular housing, and filling the interstices between said cable ends and the bores and internal chamber of said housing;

wherein the inner diameter of said bores is slightly less than the diameter of the cable to be accommodated in said splice; and wherein the inner diameter of said chamber is slightly less than the external diameter of said crimping connector.

2. The combination in accordance with claim 1 wherein the material of said housing consists essentially of ethylene propylene rubber, peroxide cured.

3. The combination in accordance with claim 1 wherein the material of said housing consists essentially of ethylene propylene rubber, sulphur cured.

4. A splice for a submersible electrical cable to be inserted therein, the ends of which cable are stripped of insulation, which comprises in combination:

a composite tubular housing having a pair of tubular end portions having bores which are interposed from each of the ends of said end portions and extend inwardly along the axis of each said tubular end portion to an internal chamber centered between said bores, and coaxial with and connected at each of its ends to said bores;

a metal crimping connector of general hollow cylindrical shape constructed to be interposed into and seated snugly in said internal chamber, and to accommodate and secure internally in crimping relation the stripped ends of said cable to be inserted;

means comprising a lubricant interposed into said tubular housing;

the inner diameter of said bores being slightly less than the diameter of said cable to be inserted in said splice, and the inner diameter of said internal chamber being slightly less than the external diameter of said crimping connector;

wherein the material of said tubular end portion comprises an elastomer having a percent resilience of at least about 70 as measured by the Yerzley method (ASTMD 945), and a durometer hardness of 55 on the Shore A scale, and consists essentially of ethylene propylene rubber, peroxide cured; and wherein said central chamber comprises a molded element of a thermoset material, the ends of which are bonded to and communicate with said tubular ends of elastomer, including said bores.

* * * * *